(12) United States Patent  
Michael et al.

(10) Patent No.: US 8,660,930 B2  
(45) Date of Patent: Feb. 25, 2014

(54) TARGET PORTFOLIO TEMPLATES

(75) Inventors: Gerard Michael, Cambridge, MA (US); Robert Thau, Cambridge, MA (US); Stefan Mitropolitsky, Cambridge, MA (US)

(73) Assignee: Smartleaf, Inc., Cambridge, MA (US)

( * ) Notice: Subject to any disclaimer, the term of this patent is extended or adjusted under 35 U.S.C. 154(b) by 0 days.

(21) Appl. No.: 13/528,040

(22) Filed: Jun. 20, 2012

(65) Prior Publication Data

US 2013/0066804 A1 Mar. 14, 2013

Related U.S. Application Data

(60) Provisional application No. 61/498,676, filed on Jun. 20, 2011.

(51) Int. Cl.
*G06Q 40/00* (2012.01)
(52) U.S. Cl.
USPC .......................................... 705/36 R; 705/37
(58) Field of Classification Search
USPC ..................................................... 705/35–40
See application file for complete search history.

(56) References Cited

U.S. PATENT DOCUMENTS

| | | |
|---|---|---|
| 2003/0041042 A1 | 2/2003 | Cohen et al. |
| 2004/0199439 A1 | 10/2004 | Herzberg et al. |
| 2005/0197850 A1 | 9/2005 | Fotteler et al. |
| 2008/0091491 A1 * | 4/2008 | Thorpe et al. ................... 705/7 |

OTHER PUBLICATIONS

International Search Report and Written Opinion for International Application No. PCT/US2012/043285 dated Sep. 21, 2012.

* cited by examiner

*Primary Examiner* — Thu Thao Havan
(74) *Attorney, Agent, or Firm* — Blakely Sokoloff Taylor Zafman (57) ABSTRACT

Methods, systems, and apparatus, including computer programs encoded on computer storage media, for preferred portfolio templates. One of the methods includes identifying a base data structure, the base data structure having nodes, each node of the base data structure having attributes. The method includes generating a dependent data structure based on the base data structure, each node in the base data structure having a corresponding a node in the dependent data structure. The method also includes determining whether to automatically change an attribute of a node in the dependent data structure in response to a change in an attribute of the corresponding node of the base data structure.

33 Claims, 10 Drawing Sheets

TARGET PORTFOLIO TEMPLATES

CROSS-REFERENCE TO RELATED APPLICATIONS

This application claims priority to U.S. Provisional Application Ser. No. 61/498,676, filed on Jun. 20, 2011, entitled "TARGET PORTFOLIO TEMPLATES," the entire contents of which are hereby incorporated by reference.

BACKGROUND

This specification relates to portfolio management. Most investment portfolios consist of a) a target "asset allocation" among investment classes and b) specific investment instruments for each investment class. There is occasion for both of these to be customized by investors and by their advisors. Wealth management firms provide customized investment advice to their clients. Investment advice can include creating custom portfolios for their clients and providing investment recommendations to their clients appropriate to the client's circumstances.

SUMMARY

In general, one innovative aspect of the subject matter described in this specification can be embodied in methods that include the actions identifying a base data structure, the base data structure having nodes, each node of the base data structure having attributes. The method includes the actions of generating a dependent data structure based on the base data structure, each node in the base data structure having a corresponding a node in the dependent data structure. The method includes the action of determining whether to automatically change an attribute of a node in the dependent data structure in response to a change in an attribute of the corresponding node of the base data structure. The determination is based on the attributes of the node of the dependent data structure.

In general, another innovative aspect of the subject matter described in this specification can be embodied in methods that include the action of identifying a base data structure, the base data structure having nodes, each node of the base data structure having attributes. The method includes the action of generating a dependent data structure based on the base data structure, each node in the base data structure having a corresponding a node in the dependent data structure. The method includes the action of restricting changes to an attribute of a node in the dependent data based on a restriction included in the attributes of the corresponding node of the base data.

In general, another innovative aspect of the subject matter described in this specification can be embodied in methods that include the action of generating a target based on attributes of nodes of a data structure. The method includes the action of identifying a portfolio, the portfolio including assets. The method includes the action of identifying a profile associated with the portfolio, the profile identifying investment preferences of the owner of the portfolio. The method includes the action of comparing a portfolio to the target model. The method also includes the action of recommending trades based at least on the comparison and the profile.

Other embodiments of this aspect include corresponding computer systems, apparatus, and computer programs recorded on one or more computer storage devices, each configured to perform the actions of the methods. A system of one or more computers can be configured to perform particular actions by virtue of having software, firmware, hardware, or a combination of them installed on the system that in operation causes or cause the system to perform the actions. One or more computer programs can be configured to perform particular actions by virtue of including instructions that, when executed by data processing apparatus, cause the apparatus to perform the actions.

The foregoing and other embodiments can each optionally include one or more of the following features, alone or in combination. One of the attributes of the base data structure may be an asset class weight. One of the attributes of the base data structure may be a model, the model may include a weighted list of securities. Determining whether to automatically change a node may include determining not to change the attribute in response to determining that the attribute has been previously changed. The methods may include the actions of determining whether the value complies with a restriction included in the attributes of the corresponding base node of the base data structure in response determining not to change the attribute of the node; and determining to raise an alert in response to determining that value does not comply. The base data structure may be an n-tiered tree and the dependent data structure may be an n-tiered tree. The restriction may limit the holdings of any portfolio following the target portfolio. A base structure node attribute may be a weight and restriction on changes of the corresponding node of the dependent data structure may be a restriction on weight. The methods may include raising an alert in response to the restricting. The method may include applying the changes in response to receiving an authorization. Recommending changes may be further based on a transaction cost associated with making a change and a drift cost associated with not making the change. The target may define an acceptable range of holdings in the one or more securities. Comparing the portfolio to the target may include comparing the assets to the acceptable range of holdings.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like nodes.

DETAILED DESCRIPTION

A portfolio management system implementing target portfolio templates enables the delivery of asset allocations and model selections customized to meet the needs of investment advisors or their clients in a manner that is compliant, scalable and is easily customized to suit the needs of individual investors. The portfolio management system employs tiered structures that enable users to describe, distribute, customize, and update investment guidance throughout an organization.

Figure 1A:
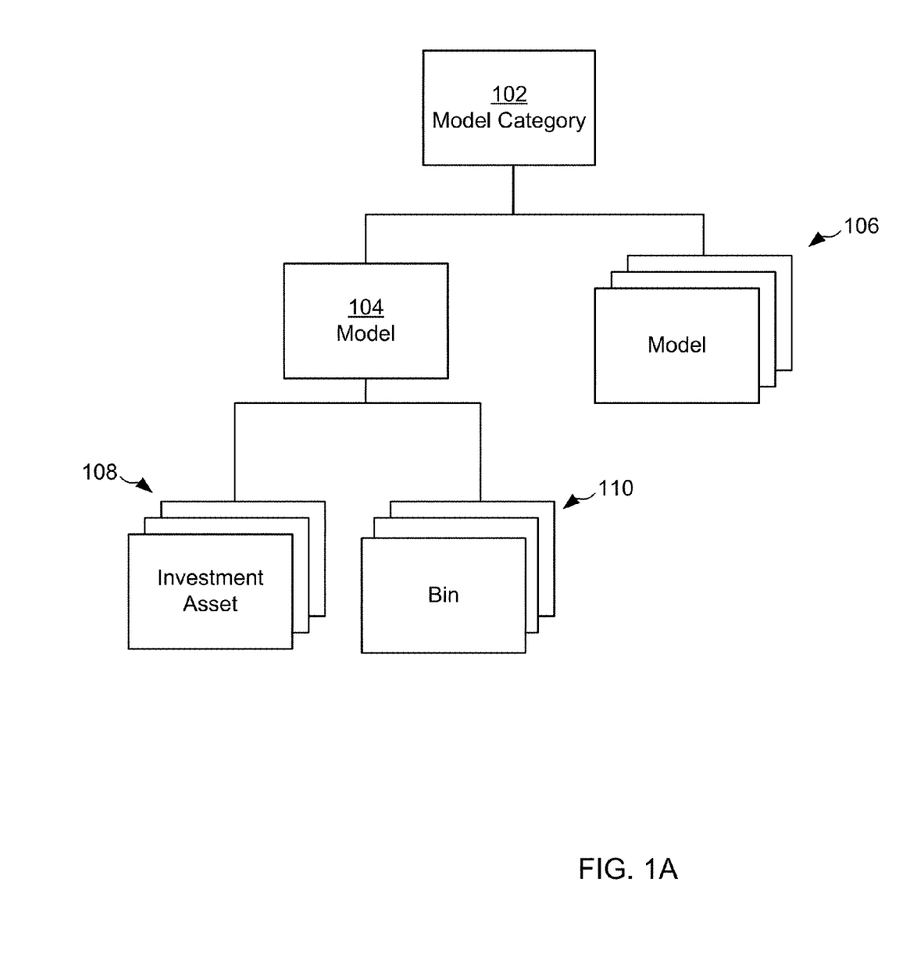
FIGS. 1A and 1B illustrate relationships between model categories and investment assets.
Figure 1B:
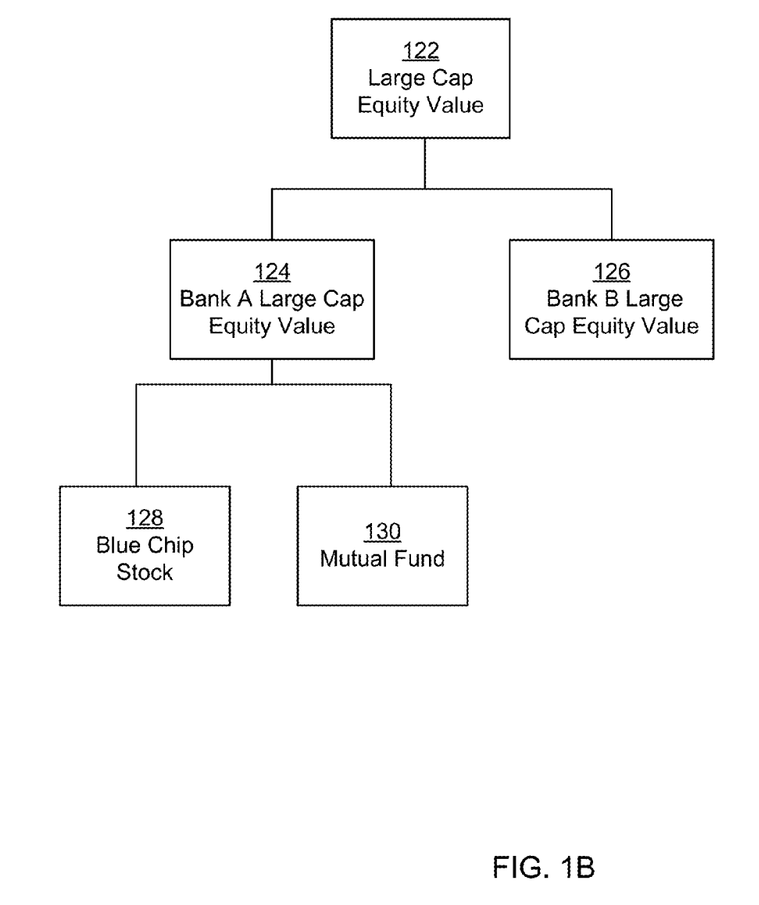

FIGS. 1A and 1B illustrate relationships between model categories and investment assets. A model category 102 describes a classification of investment assets. For example, a model category can describe whether the investment assets are equities or bonds. In the case where a model category describes equity securities, the model category can describe the characteristics of the equity. Characteristics of an equity security can include market capitalization, expected return profile, and the region of the securities. For example, a model category can be created for "U.S. Large Capitalization Value Stocks" or "International Small Cap Growth" or any of a number of different categories.

In the case where a model category describes bonds, the model category can describe the characteristics of the bond. Characteristics of a bond can include time to maturity, bond duration, credit rating, the type of institution offering the bond, etc. For example, a model category can be created for "tax-free municipal bonds." Model categories can also describe other classifications of investment assets, including, for example, derivatives such as options, futures, and swaps.

Each model category 102 is associated with one or more models 104, 106. Models are collections of securities. Each security included in a model can have a weight assigned to it—either a percentage of the total holdings assigned to the model or an arbitrary number of shares. In the case of share-based models, the number of shares indicated for each security is multiplied by the price of the security on a given day and then calculated as a percentage of the total. In a target portfolio template, models can only be placed within the model category to which they belong. Generally, a model 104 represents collections of one or more securities 108 that satisfy a particular model category 102. For example, an investment bank can provide a collection of equity securities and/or mutual funds that it recommends to satisfy the previously discussed "U.S. Large Capitalization Value Stocks" market category. In some scenarios, a model may include only a single security.

A model 104 can also include one or more bins 110. A bin is used when circumstances make it undesirable to associate a specific security within the model 104. There may be no securities that are sufficiently liquid to allow for specificity. For example, a "Worcester Water Works" municipal bond may not be available on the market in sufficient quantities. A bin enables the creator of the model to specify a type of asset such as "AAA rated Massachusetts municipal bonds that have duration of at least ten years."

In some implementations, a model may describe a weighted distribution of across multiple security types. For example, the model may require a 60% investment in individual equities and a 40% investment in a mutual fund.

FIG. 1A illustrates an example of a model category with associated models. The model category "Large Cap Equity Value" 122 has two models associated with it "Bank A Large Cap Equity Value" model 124 and "Bank B Large Cap Equity Value" model 126. The "Bank A Large Cap Equity Value" model 124 as two securities associated with it, "Blue Chip Stock" investment asset 128 and "Mutual Fund" investment asset 130. For simplicity, securities associated with the "Bank B Large Cap Equity Value" model 126 are not shown.

Model categories and models can be used to create target portfolio templates. A target portfolio template includes a set of model categories, a recommended allocation of resources among the categories. The target portfolio template can incorporate flexibility to allow for variation in dependent templates built using the target portfolio templates.

A target portfolio template can be created based on another target portfolio template. Target portfolio templates that are based on another target portfolio template are referred to as dependent templates, the target portfolio template upon which the dependent template is based is referred to as a base template.

Figure 2:
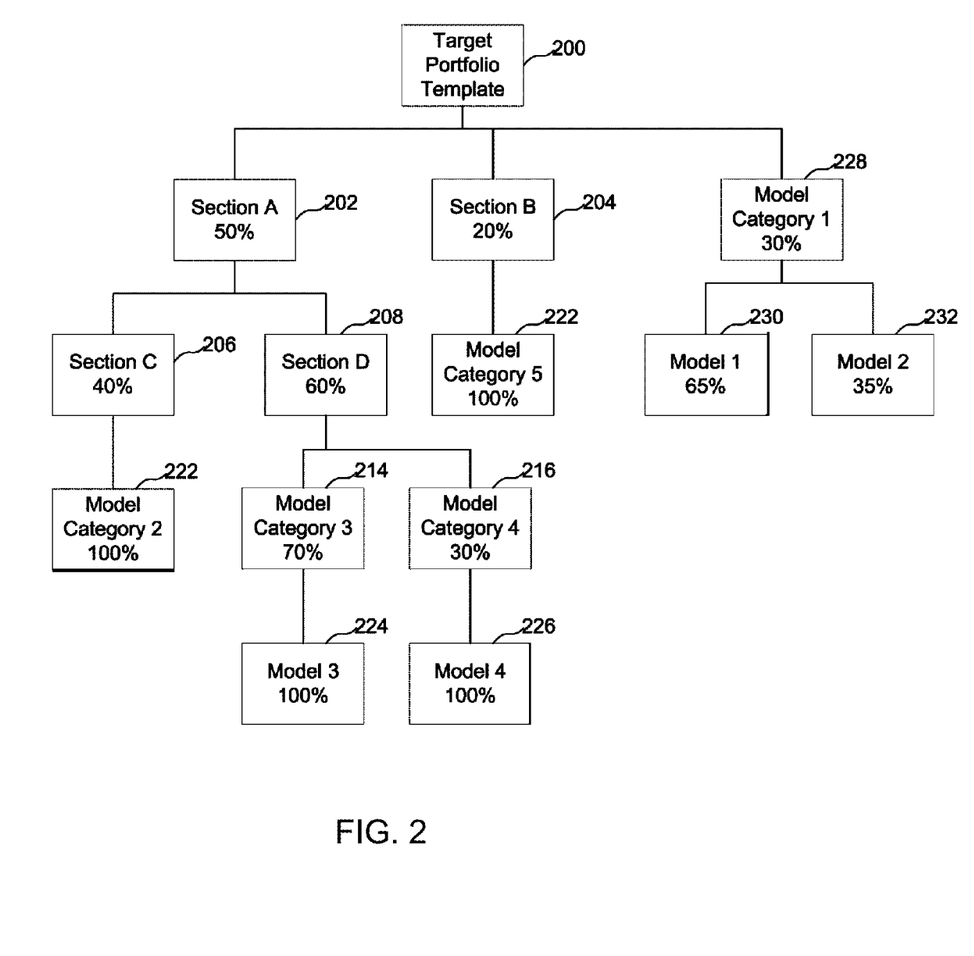
FIG. 2 is a hierarchical structure representing a target portfolio template.

As shown in FIG. 2, a target portfolio template 200 is represented as a hierarchical structure that includes nodes organized into multiple tiers. In some implementations, target portfolio templates can be comprised of three basic types of nodes: sections, model categories and models. Sections allow users to organize different types of assets into like classes. Sections can be created at the top-tier of a template. For example, the target portfolio template 200 includes "Section A" 202, "Section B" 204, "Section C" 206, and "Section D" 208. Sections can be nested to create tiers of organization, for example "Section C" 206 and "Section D" 208 are nested under "Section A" 202. Section A may represent equities, Section B may represent Fixed Income, Section C may represent Large Cap Equities, and Section D may represent Small Cap Equities.

The target portfolio template 200 can also include model categories. As described above, a model category represents an asset classification for which models are provided. For example, a model category may represent the asset classification for "Large Cap Value Equity." The "Large Cap Value Equity" model category represents equity assets in large capitalization corporations that are believed to be priced below their actual value. Different investment banks and investment advisors create model portfolios for different model categories. Model categories link sections to investment instruments. In general, model categories can be nested under sections, such as "Model Category 2" 222, "Model Category 3" 214, and "Model Category 4" 216. Model categories can also be top tier nodes under the target portfolio template 200, such as "Model Category 1" 228.

In some implementations, the target portfolio template can include default models for a model category. For example, "Model Category 1" 228 includes "Model 1" 230 with a target of 65% and "Model 2" 232 with the target of 35%. In some implementation, a model category does not necessarily provide default models, for example, "Model Category 2" 222. In these scenarios, any model for the model category "Model Category 2" can be used by a dependent template created based on the target portfolio template 200.

In some implementations, the target portfolio template can include a set of models that are determined to be appropriate for dependent templates. The models included in the target portfolio template 200 are a subset of the models available under the model category generally. For example, referring to FIG. 1B, the Large Cap Equity Value model category 112 includes the Bank A Large Cap Equity Value model 124 and the Bank B Large Cap Equity Value model 126. The creator of a target portfolio template may elect to include only the Bank A Large Cap Equity Value model 124 and to exclude the Bank B Large Cap Equity Value model 126. Therefore, any target portfolio templates or dependent templates created based on the target portfolio template 200 could not include the Bank B Large Cap Equity model 126.

Referring to FIG. 2, "Model 1" 230 and "Model 2" 232 are nested under "Model Category 1" 228. "Model 3" 224 is nested under "Model Category 3" 214. "Model 4" 226 is nested under "Model Category 4" 216.

Generally, there is no limit to the number of tiers in a template, the number of sections in a single tier, or the number of model categories contained within a single section or the number of models within a section containing a model category.

Each node in the target portfolio template can include a weight percentage. For example, "Section A" 202 includes a weight percentage of 50%. In addition to the weight percentage, each node can be assigned a minimum percentage and a maximum percentage. The minimum and maximum percentages for nodes in a target portfolio template can represent acceptable values that a user may select when creating a dependent template. The minimum and maximum percentages define the extent to which a user may deviate from the recommended allocation. In some implementations, the sum of the weight percentages of the child nodes nested under any given parent is 100%. For example, "Section C" 206 and "Section D" 208 are sub-nodes of "Section A" 202. The sum of the weight percentages for these nodes is 100% (40%+60%).

In some implementations, a child template associated with an individual investor can override any weight associated with a base template. For example, an investor may own a small company and therefore not desire any further exposure to small capitalization stocks. In some implementations, setting a weight outside the minimum and maximum requires an explicit override. The override can include an explanation as to why the weight was set beyond the minimum and maximum values.

In some implementations, each node in the target portfolio template can also include a range. A range represents the amount of deviation from the weight percentage that is acceptable for portfolios associated with a dependent template based on the target portfolio template. For example, a dependent template based on a target portfolio template that includes five percent of "Stock A" with a two percent range will match the dependent template if the portfolio includes between 3% and 7% "Stock A." In some implementations, an exact range can be specified, for example "2% to 5%." In other implementations, the range is defined by a single amount which defines how far the portfolio can vary from the weight percentage of the node, for example, "+/−3%". In other implementations, the range is defined as a percentage of the weight. For example, a node with a weight of 10% and a range of 20% would have an absolute range of 8-12% (+/− 2%). Generally, ranges do not have to be defined for any node.

Figure 3A:
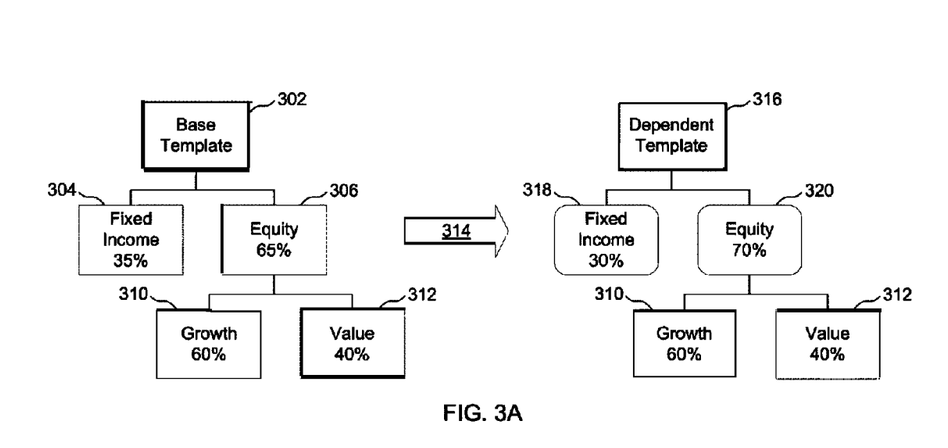
FIGS. 3A-3B illustrate examples of base and dependent templates.
Figure 3B:
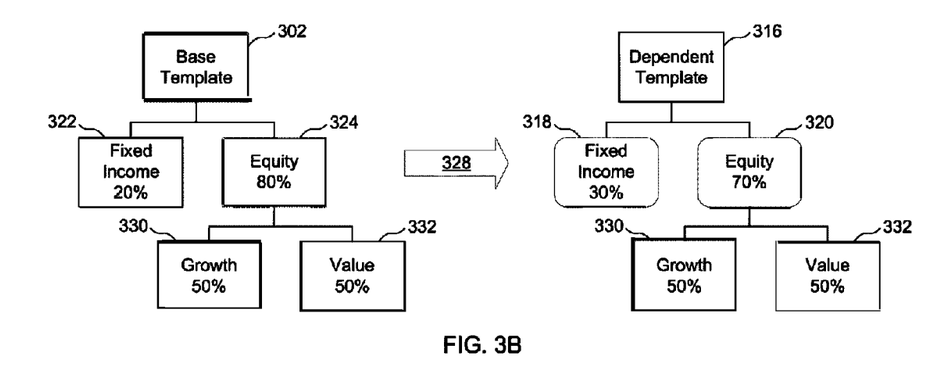

FIGS. 3A-3B illustrate examples of base and dependent templates. Referring to FIG. 3A, a dependent template 316 is created based on a base template 302. In this example, base template 302 includes two model categories, a fixed income category 304 and an equity category 306. The fixed income category 304 is assigned a percentage of 35%, indicating that a portfolio associated with the base template would preferably include 35% of its assets allocated to fixed income assets. The equity category 306 is assigned a percentage of 65%, indicating that a portfolio associated with the base template would preferably include 65% of its assets allocated to equity assets. Nested under the equity category 306 are two models, a growth model 310 and a value model 312. The growth model 310 is assigned a percentage of 60%, indicating that a portfolio associated with the base template would preferably include 60% of its assets that are allocated to equity assets further allocated to growth assets. The value model 312 is assigned a percentage of 40%, indicating that a portfolio associated with the base template would preferably include 40% of its assets that are allocated to equity assets further allocated to value assets. The modified categories are represented by a box with rounded corners to signify that the dependent template 316 has specifically modified the values provided by the base template 302 for those categories.

Represented by process arrow 314, a dependent template 316 is created based on the base template 302. In this example, the fixed income category 318 has been modified from the fixed income category 304 of the base template. The percentage has been modified to 30%. Similarly, the equity category 320 has been modified from the equity category 306 of the base. In this example, the percentage has been set to 70%. In some implementations, dependent templates can only have targets different from their base template if the base template specifies a minimum and maximum percentage (as discussed above).

In some implementations, if a node of a base template 302 includes a minimum and maximum percentage, the corresponding node of the dependent template 316 can be assigned any weight percentage that is within the range defined by the minimum percentage and the maximum percentage of the base template. The corresponding node of the dependent template can also include a minimum and a maximum percentage within the minimum and maximum percentages of nodes of the base template. In some implementations, any percentage can be assigned to nodes of the dependent template. In some implementations, the ability to assign weight, maximum and minimum percentages to the nodes of a dependent template depends on the permissions of the user creating the dependent template.

FIG. 3B illustrates how modifications to the base template 302 affect the dependent template 316. Base template 302 may have multiple dependent templates, each of which would be affected; however, FIG. 3B shows only one dependent template 316. In this example, the fixed income category 322 of the base template 302 has been modified to a weight of 20%, the equity category 324 of the base template 302 has been modified to a weight of 80%, the growth item 330 of the base template has been modified to a weight of 50%, and the value item 332 of the base template has been modified to a weight of 50%. Represented by process arrow 328, the changes to the base template 302 affect the dependent template 316, except where the dependent template 316 has explicitly modified the values provided by the base template 302, as represented by the rectangles with rounded corners. In this example, the fixed income category 318 and the equity category 320 remain unchanged, since they were previously modified on the dependent template as described above. Nested beneath the previously modified equity category 320 is a growth item 330 and a value item 332. The growth item 330 and the value item 332 have been modified to reflect the modified values in the base template 302.

Figure 4:
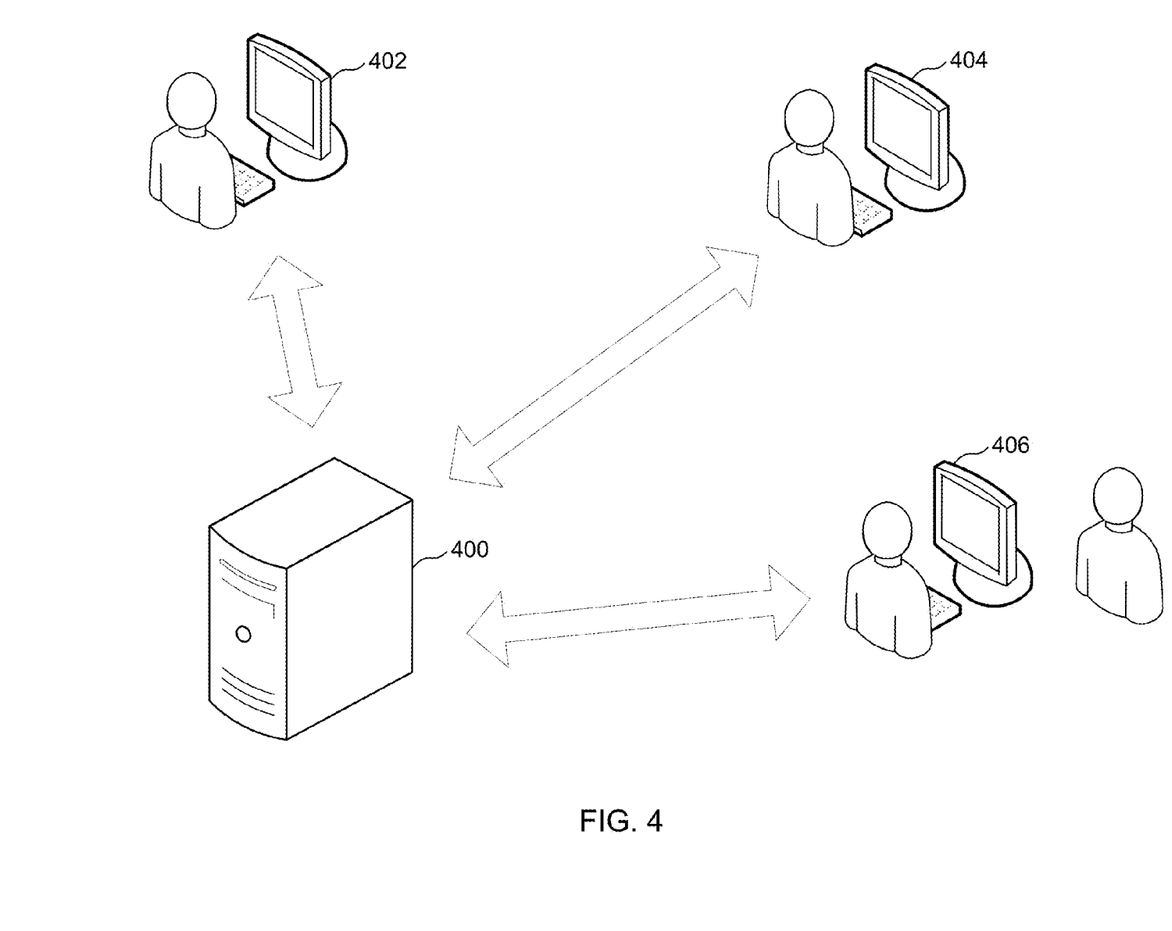
FIG. 4 illustrates an environment in which target portfolio templates may be utilized.

FIG. 4 illustrates an environment in which target portfolio templates may be utilized. An investment strategy manager 402 at a portfolio management firm can create a target portfolio template. The created template is stored on a computer system 400. In some implementations, the system 400 provides a graphical user interface through which target portfolio templates can be created. The system 400 enables a firm to distribute target portfolio templates to their advisors, who have the ability to create dependent templates that customize the provided target portfolio templates within limits defined by the firm.

For example, a regional manager 404 may create a dependent template based on a target portfolio template created by the investment strategy manager. In some implementations, the regional manager may be able to create independent target portfolio templates based on other target portfolio templates (for example, the regional manager may be able to create a new base template based on the base template created by the investment manager. In some implementations, the system 400 may limit the amount of customization available to the regional manager 404 or other user, based on the user's role.

An advisor 406 working with a client can create a dependent template based on the target portfolio template of the regional manager 404.

The target portfolio templates can be either dependent or independent of their base templates. Dependent templates change as changes are made to their associated base template. Independent templates do not change as their associated base templates do. Changes made to base templates are reflected in their dependent templates in a manner that preserves any customizations made at levels below that of the base.

In some implementations, users can create independent copies of target portfolio templates. Independent templates are copies that initially inherit the structures and properties of the target portfolio template from which they were copied, but do not inherit subsequent changes. After their creation, independent copies are treated by the system in the same manner as other target portfolio templates.

Figure 5:
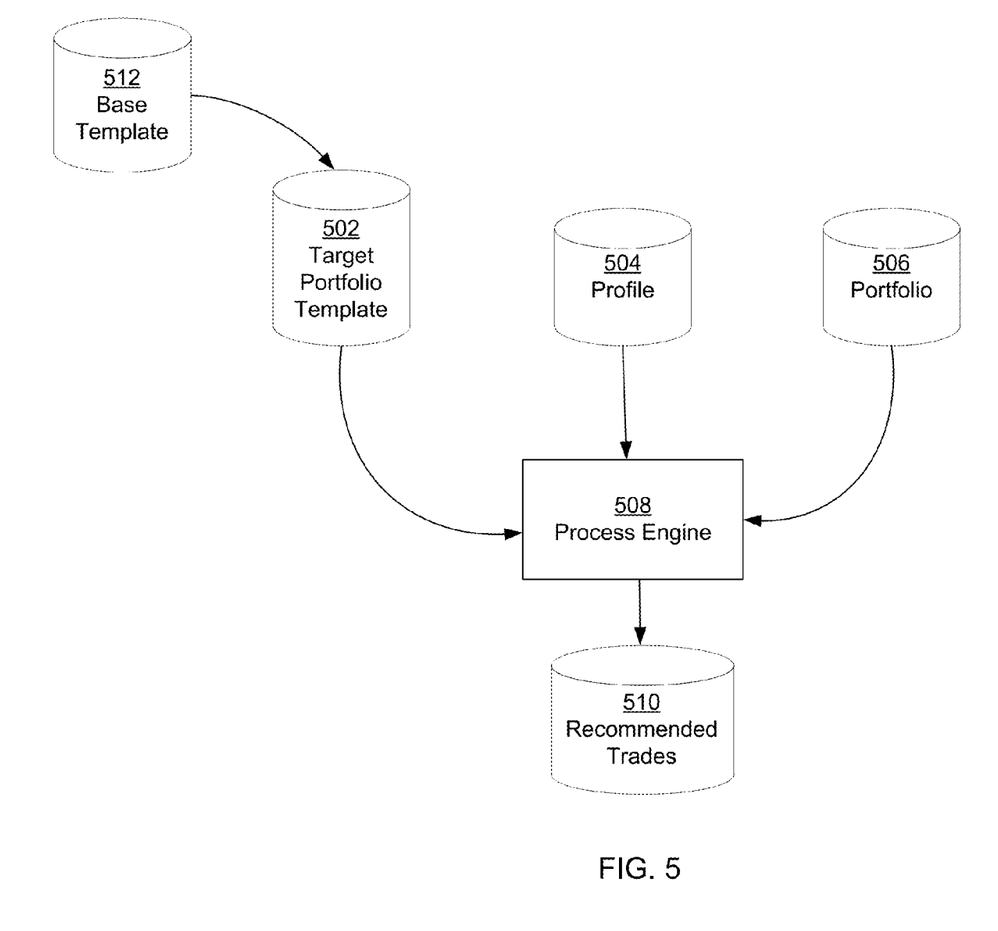
FIG. 5 illustrates updating a portfolio using a target portfolio template and a profile.

FIG. 5 illustrates rebalancing a portfolio 506 using a target portfolio template 502 and a profile 504. As discussed above, the target portfolio template 502 describes a desired state of a portfolio 506. For example, the target portfolio template can define allocation of the assets in the portfolio among different assets and/or asset classes. A process engine 508 compares the portfolio 506 to the target portfolio template 502 and determines a measure of inconsistency between the target portfolio template and the portfolio. The measure of inconsistency is referred to as drift. The profile 504 describes preferences which affect trades that the process engine 508 recommends to minimize drift. For example, the profile may indicate that the owner of the portfolio 506 is tax sensitive. Therefore, trades which result in an increased tax burden should be minimized. The portfolio 506 can also include other preferences. For example, the owner of the portfolio may only wish to invest in certain investments, for example, equity positions in companies that are ecologically responsible. The owner of the portfolio 506 may wish to avoid other investments, for example, high-risk bonds.

Some restrictions in the profile 504 can be weighted, for example, a portfolio owner who is tax sensitive may nevertheless be willing to accept certain tax consequences. The weighting is a measure of the strength of the portfolio owner's preference. Other preferences in the profile 504 that can be weighted might, for example, include security rankings, the desirability of "tax loss harvesting", or whether short term losses are more valuable than long term losses. In some implementations, the process engine 508 determines recommended trades 510 by comparing the effects of multiple actions on the portfolio 506. For example, the process engine 508 may compare the cost of selling an asset versus the drift that would result from keeping the asset. The cost can be divided into different categories of cost, for example, commissions, bid/ask spread, and tax liability.

The process engine 508 identifies a set of recommended trades 510 that balance the interests of the portfolio owner as described in the profile 504 with a goal of minimizing drift from the target portfolio template 502.

For example, an example portfolio includes 70% equity, 20% fixed income and 10% cash. On the first day, the target portfolio template 502 indicates a target of 65% equity, with an acceptable range of 60% to 70% equity; a target of 25% fixed income, with an acceptable range of 20% to 30% fixed income; and a target of 10% cash with an acceptable range of 5 to 15% cash. The portfolio 506 is compared to the target portfolio template 502, and the process engine 508 recommends selling some equity assets held in the portfolio and purchasing some fixed income assets. In general, trades recommended by the process engine 508 are specific; for example, buy $10,000 of IBM. Later, a base template 512 is updated to indicate a target of 50% equity, with an acceptable range of 45% to 55% equity; a target of 40% fixed income, with an acceptable range of 35% to 45% fixed income; and a target of 10% cash with an acceptable range of 5 to 15% cash. The targets are propagated from the base template 512 to the target portfolio template 502 as described above. On the next day, the updated target portfolio template 502 is compared to the portfolio. Assume that the recommended trades were not executed and the portfolio remains the same. In this scenario, the portfolio asset allocation is outside the permissible range as defined by the target portfolio template 502. In this case, the process engine 508 creates a recommended trade and indicates that the trade is a mandated trade, that is, that the trade is necessary to bring the portfolio into compliance with the target portfolio template.

Figure 6:
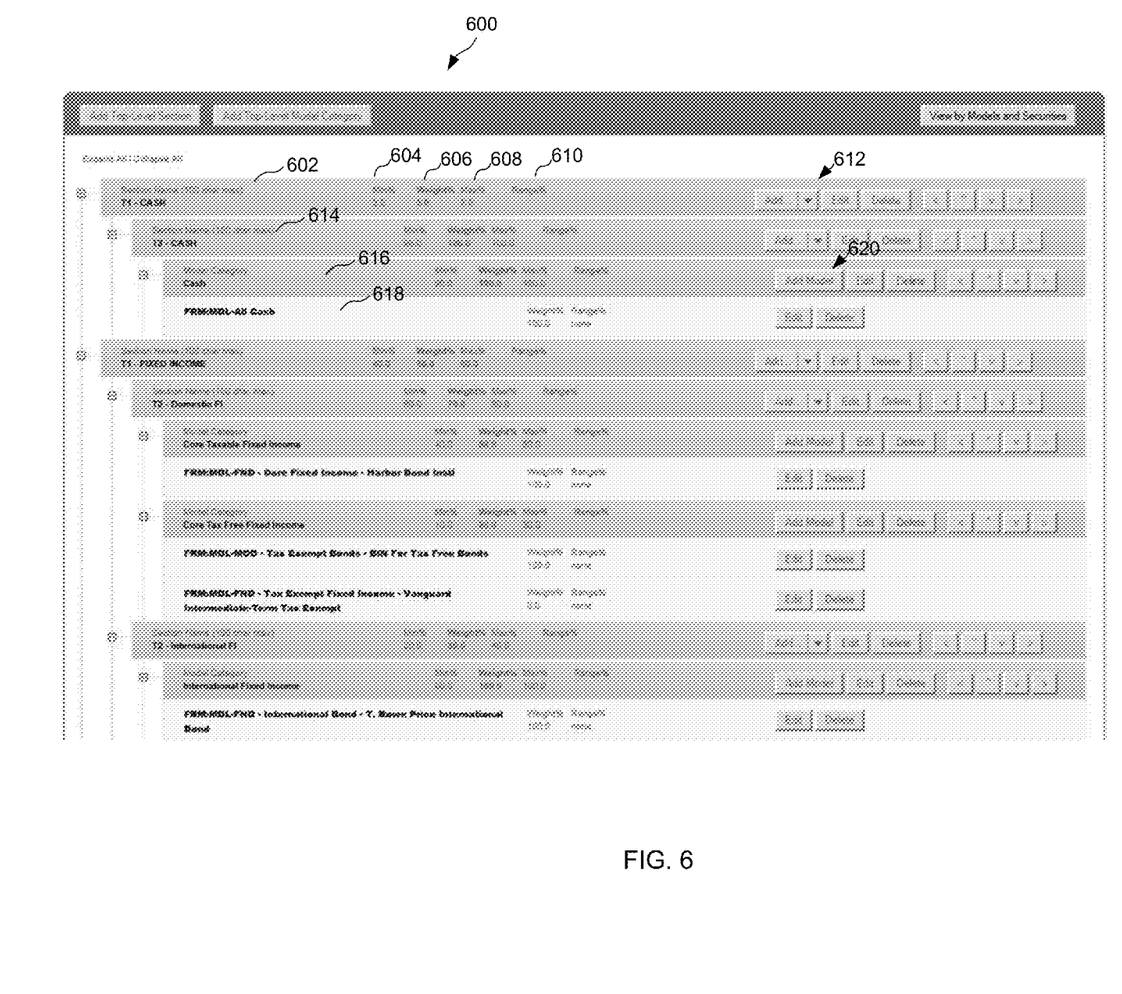
FIG. 6 illustrates an example of a user interface for displaying a target portfolio template.

FIG. 6 illustrates an example of a user interface 600 for displaying a target portfolio template. The user interface uses a nested tree structure to display the target portfolio template. The user interface displays a "T1—CASH" section 602. The user interface displays a weight percentage 606, a minimum percentage 604, a maximum percentage 608, and a range 610 associated with the "T1—CASH" section 602. The user interface also displays action buttons 612 that enable a user to add nested sections or model categories.

The user interface displays a "T2—CASH" section 614 nested under the "T1—CASH" section 602. The user interface also displays a "Cash" model category 616 nested under the "T2—CASH" section 614. The "Cash" model category is associated with action buttons 620 that enable the user to add a model, edit the model category, or delete the model category.

The user interface displays a "FRM:MDL—All Cash" model 618 nested under the "Cash" model category 616.

Figure 7:
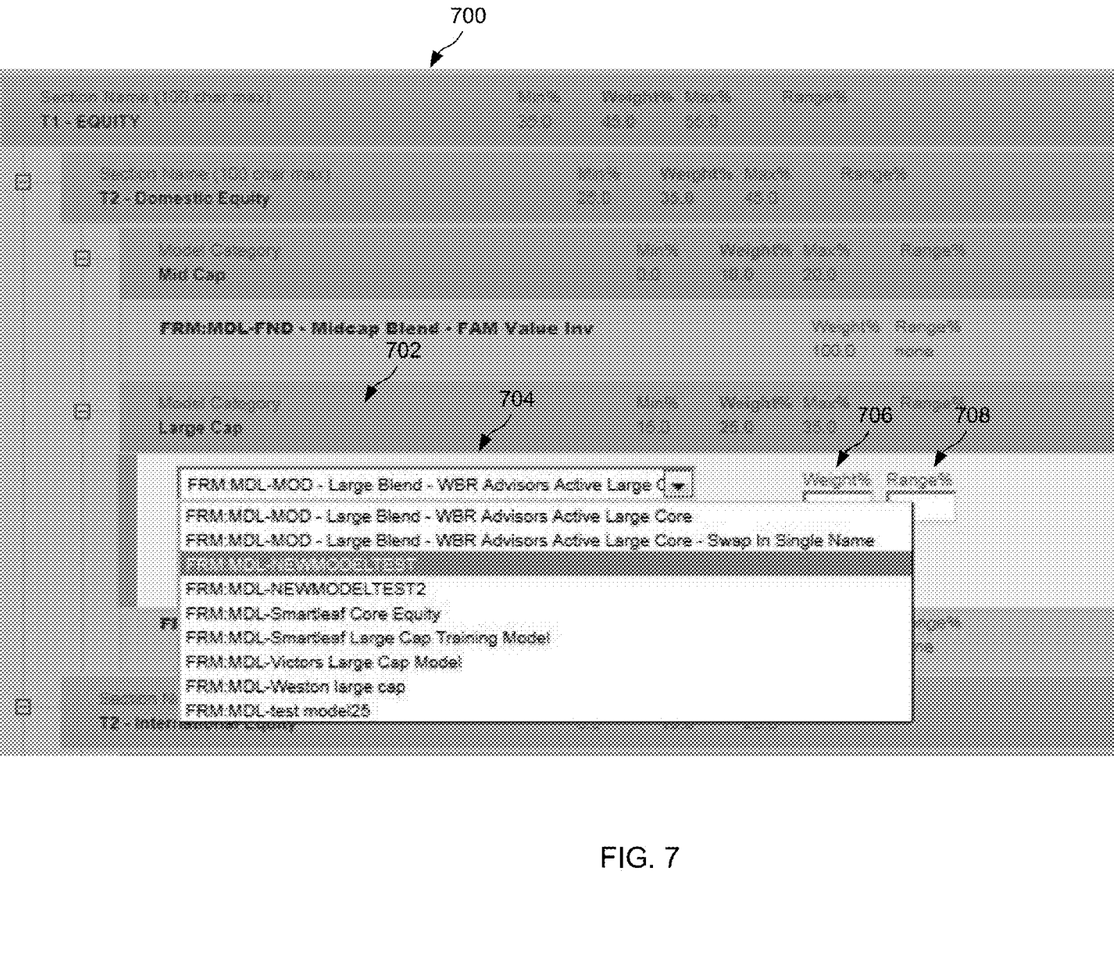
FIG. 7 illustrates an example of a user interface for adding a model to a model category.

FIG. 7 illustrates an example of a user interface 700 for adding a model to a template. A model is added to a template in model category 702, for example, by selecting an add button included in the action buttons 620 on FIG. 6. A user is then presented with a drop down box 704. The drop down box 704 includes the models appropriate for the model category 702 and any base template, as discussed above. The user is also presented with the opportunity to supply a weight percentage 706 and a range percentage 708.

Figure 8:
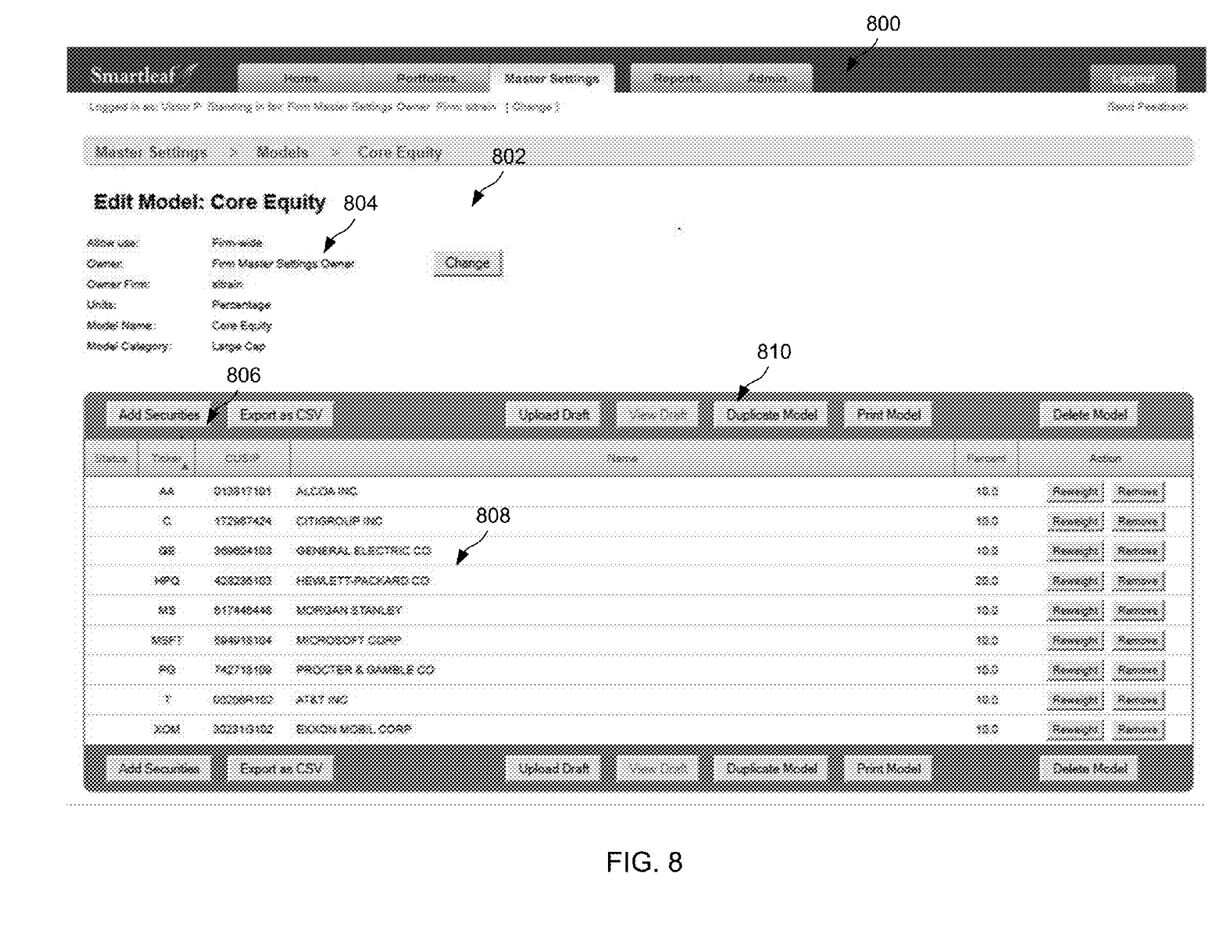
FIG. 8 illustrates an example of a user interface for editing a model.

FIG. 8 illustrates an example of a user interface 800 for editing a model. The user interface 800 displays a model, in this example the "Core Equity" model 802. The user interface can display information about the model including how the model may be used (for example, can it be used firm-wide, within a region, within a particular business unit, by individuals with specific permissions, etc.); an owner of the model, in general the owner of the model is the only individual who can update or delete the model; an indication of the firm or other supplier who provided the model (for example, "Investment Bank A"); the units used in the model; the name of the model; and the model category to which the model belongs.

The user interface also enables users to add additional securities 806 to the model and to create a duplicate of the model 810.

Figure 9:
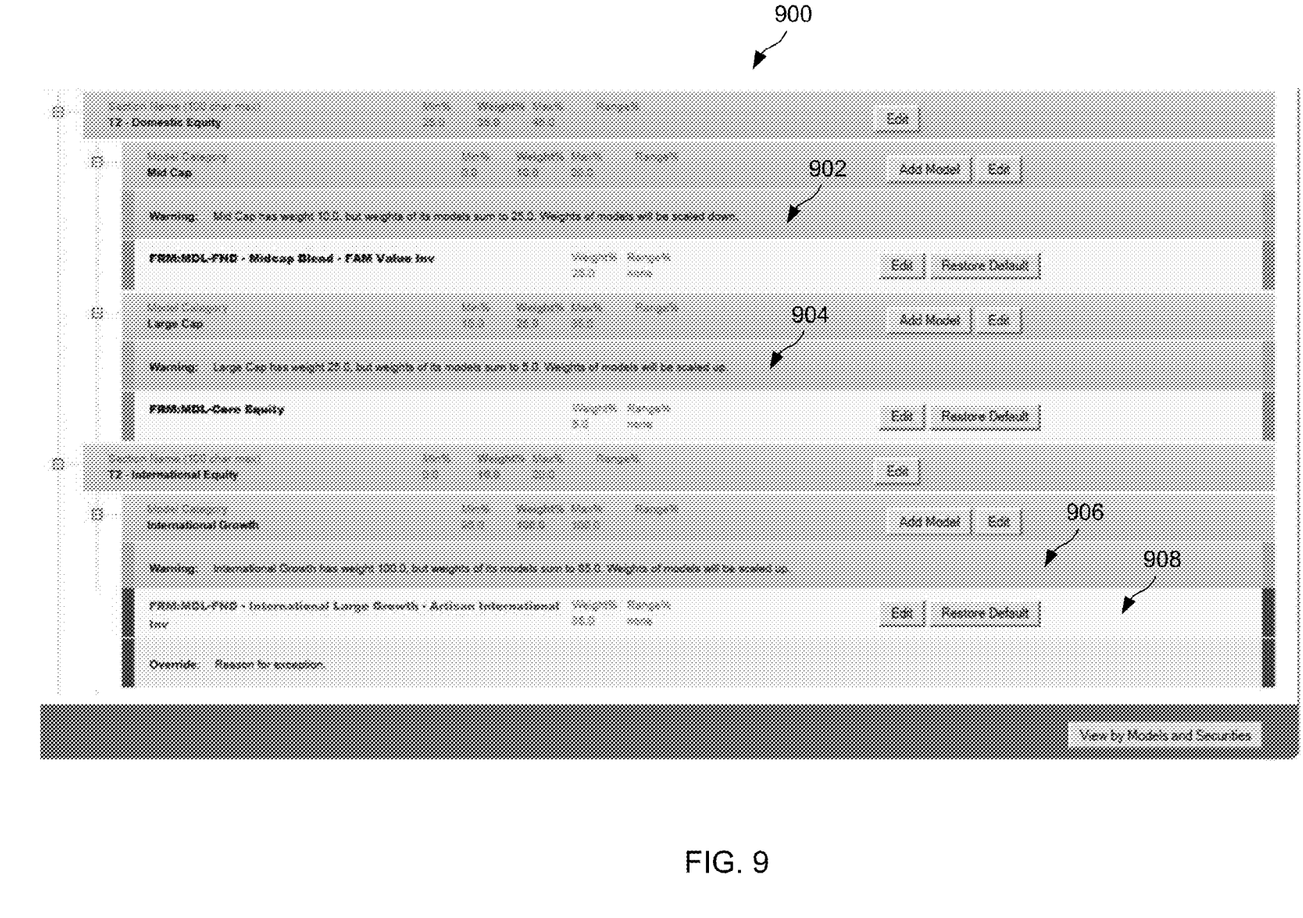
FIG. 9 illustrates an example of a user interface displaying error and warning messages.

FIG. 9 illustrates an example of a user interface 900 displaying error and warning messages. After a user has modified a target portfolio template errors and warnings may occur. The user interface displays warnings, such as a warning that the weight percentages do not sum to 100% 902, 904,

906. In some implementations, if the weight percentages do not sum to 100% the weights are scaled. For example, if a model contains two categories, one having a weight of 15% and the other having a weight of 45% then the weights will be proportionally scaled up (in this example, to 25% and 75% respectively.). Similarly, if the sum of the weight percentages exceeds 100%, the weight percentages are scaled down. In these implementations, the user is presented with a warning that scaling will occur.

The user interface 900 can also display error messages. The user interface may display an error message because the selected weight percentage is outside the permissible range of the base template. In some implementations, a user may be allowed to override the error by providing a reason.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible program carrier for execution by, or to control the operation of, data processing apparatus. Alternatively or in addition, the program instructions can be encoded on a propagated signal that is an artificially generated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to as a program, software, a software application, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential nodes of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A computer-implemented method comprising:
identifying a base data structure comprising a base template of asset allocations, the base data structure having nodes, each node of the base data structure having attributes, wherein the nodes are a hierarchical structure of base nodes, at least one of the base nodes is a base model category node defining a classification, at least one of the base nodes is a base model node, and the base model node is a collection of items that satisfy the classification of the base model category;
generating a dependent data structure, based on the base data structure, that forms a dependent template generated from the base template, the dependent template including a hierarchical structure of derived nodes, wherein each node in the base data structure having a corresponding a node in the dependent data structure, the dependent template further including a derived model node that corresponds to the base model category node; and
determining whether to automatically change an attribute of the derived model node in the dependent data structure in response to a change in a base model attribute of the base model node of the base data structure;
wherein the determination is based on whether the attributes of the derived model node of the dependent data structure was overwritten.

2. The method of claim 1, wherein one of the attributes of the base data structure is an asset class weight.

3. The method of claim 1, wherein one of the attributes of the base data structure is a model, the model including a weighted list of securities.

4. The method of claim 1, wherein determining whether to automatically change a node includes determining not to change the attribute in response to determining that the attribute has been previously changed.

5. The method of claim 4, further comprising:
determining whether the value complies with a restriction included in the attributes of the corresponding base node of the base data structure in response determining not to change the attribute of the node; and
determining to raise an alert in response to determining that value does not comply.

6. The method of claim 1, wherein the base data structure is an n-tiered tree and the dependent data structure is an n-tiered tree.

7. A computer-implemented method comprising:
identifying a base data structure comprising a base template of asset allocations, the base data structure having nodes, each node of the base data structure having attributes, wherein the nodes are a hierarchical structure of base nodes, at least one of the base nodes is a base model category node defining a classification, at least one of the base nodes is a base model node, and the base model node is a collection of items that satisfy the classification of the base model category;
generating a dependent data structure, based on the base data structure, that forms a dependent template generated from the base template, the dependent template including a hierarchical structure of derived nodes, wherein, each node in the base data structure having a corresponding a node in the dependent data structure, wherein the dependent template further including a derived model node that corresponds to the base model category node; and
restricting changes to an attribute of the derived model node in the dependent data structure based on a restriction included in an attribute of the corresponding base model node of the base data structure.

8. The method of claim 7, wherein the restriction limits the holdings of any portfolio following the target portfolio.

9. The method of claim 8, wherein a base structure node attribute is a weight and restriction on changes of the corresponding node of the dependent data structure is a restriction on weight.

10. The method of claim 7, further comprising raising an alert in response to the restricting.

11. The method of claim 10, further comprising applying the changes in response to receiving an authorization.

12. A computer storage device encoded with computer program instructions that when executed by one or more computers cause the one or more computers to perform operations comprising:
identifying a base data structure comprising a base template of asset allocations, the base data structure having nodes, each node of the base data structure having attributes, wherein the nodes are a hierarchical structure of base nodes, at least one of the base nodes is a base model category node defining a classification, at least one of the base nodes is a base model node, and the base model node is a collection of items that satisfy the classification of the base model category;

generating a dependent data structure, based on the base data structure, that forms a dependent template generated from the base template, the dependent template including a hierarchical structure of derived nodes, wherein each node in the base data structure having a corresponding a node in the dependent data structure, the dependent template further including a derived model node that corresponds to the base model category node; and determining whether to automatically change an attribute of the derived model node in the dependent data structure in response to a change in a base model attribute of the base model node of the base data structure;

wherein the determination is based on whether the attributes of the derived model node of the dependent data structure was overwritten.

13. The storage device of claim 12, wherein one of the attributes of the base data structure is an asset class weight.

14. The storage device of claim 12, wherein one of the attributes of the base data structure is a model, the model including a weighted list of securities.

15. The storage device of claim 12, wherein determining whether to automatically change a node includes determining not to change the attribute in response to determining that the attribute has been previously changed.

16. The storage device of claim 15, further comprising computer program instructions that when executed by one or more computers cause the one or more computers to perform operations comprising:

determining whether the value complies with a restriction included in the attributes of the corresponding base node of the base data structure in response determining not to change the attribute of the node; and determining to raise an alert in response to determining that value does not comply.

17. The storage device of claim 12, wherein the base data structure is an n-tiered tree and the dependent data structure is an n-tiered tree.

18. A computer storage device encoded with computer program instructions that when executed by one or more computers cause the one or more computers to perform operations comprising:

identifying a base data structure comprising a base template of asset allocations, the base data structure having nodes, each node of the base data structure having attributes, wherein the nodes are a hierarchical structure of base nodes, at least one of the base nodes is a base model category node defining a classification, at least one of the base nodes is a base model node, and the base model node is a collection of items that satisfy the classification of the base model category;

generating a dependent data structure, based on the base data structure, that forms a dependent template generated from the base template, the dependent template including a hierarchical structure of derived nodes, wherein each node in the base data structure having a corresponding a node in the dependent data structure, wherein the dependent data structure forming a dependent template generated from the base template, the dependent template including a hierarchical structure of derived nodes, the dependent template further including a derived model node that corresponds to the base model category node; and restricting changes to an attribute of the derived model node in the dependent data structure based on a restriction included in an attribute of the corresponding base model node of the base data structure.

19. The storage device of claim 18, wherein the restriction limits the holdings of any portfolio following the target portfolio.

20. The storage device of claim 19, wherein a base structure node attribute is a weight and restriction on changes of the corresponding node of the dependent data structure is a restriction on weight.

21. The storage device of claim 18, further comprising computer program instructions that when executed by one or more computers cause the one or more computers to perform operations comprising raising an alert in response to the restricting.

22. The storage device of claim 21, further comprising computer program instructions that when executed by one or more computers cause the one or more computers to perform operations comprising applying the changes in response to receiving an authorization.

23. A system comprising:

one or more computers and one or more storage devices storing instructions that are operable, when executed by the one or more computers, to cause the one or more computers to perform operations comprising:

identifying a base data structure comprising a base template of asset allocations, the base data structure having nodes, each node of the base data structure having attributes, wherein the nodes are a hierarchical structure of base nodes, at least one of the base nodes is a base model category node defining a classification, at least one of the base nodes is a base model node, and the base model node is a collection of items that satisfy the classification of the base model category;

generating a dependent data structure, based on the base data structure, that forms a dependent template generated from the base template, the dependent template including a hierarchical structure of derived nodes, wherein each node in the base data structure having a corresponding a node in the dependent data structure, the dependent template further including a derived model node that corresponds to the base model category node; and determining whether to automatically change an attribute of the derived model node in the dependent data structure in response to a change in a base model attribute of the base model node of the base data structure;

wherein the determination is based on whether the attributes of the derived model node of the dependent data structure was overwritten.

24. The system of claim 23, wherein one of the attributes of the base data structure is an asset class weight.

25. The system of claim 23, wherein one of the attributes of the base data structure is a model, the model including a weighted list of securities.

26. The system of claim 23, wherein determining whether to automatically change a node includes determining not to change the attribute in response to determining that the attribute has been previously changed.

27. The system of claim 26, wherein the one or more storage devices further comprise computer program instructions that when executed by one or more computers cause the one or more computers to perform operations comprising:

determining whether the value complies with a restriction included in the attributes of the corresponding base node of the base data structure in response determining not to change the attribute of the node; and determining to raise an alert in response to determining that value does not comply.

28. The system of claim 23, wherein the base data structure is an n-tiered tree and the dependent data structure is an n-tiered tree.

29. A system comprising:
one or more computers and one or more storage devices storing instructions that are operable, when executed by the one or more computers, to cause the one or more computers to perform operations comprising:
identifying a base data structure comprising a base template of asset allocations, the base data structure having nodes, each node of the base data structure having attributes, wherein the nodes are a hierarchical structure of base nodes, at least one of the base nodes is a base model category node defining a classification, at least one of the base nodes is a base model node, and the base model node is a collection of items that satisfy the classification of the base model category;
generating a dependent data structure, based on the base data structure, that forms a dependent template generated from the base template, the dependent template including a hierarchical structure of derived nodes, wherein each node in the base data structure having a corresponding a node in the dependent data structure, the dependent template further including a derived model node that corresponds to the base model category node; and
restricting changes to an attribute of the derived model node in the dependent data structure based on a restriction included in an attribute of the corresponding base model node of the base data structure.

30. The system of claim 29, wherein the restriction limits the holdings of any portfolio following the target portfolio.

31. The system of claim 30, wherein a base structure node attribute is a weight and restriction on changes of the corresponding node of the dependent data structure is a restriction on weight.

32. The system of claim 29, wherein the one or more storage devices further comprise computer program instructions that when executed by one or more computers cause the one or more computers to perform operations comprising raising an alert in response to the restricting.

33. The system of claim 32, wherein the one or more storage devices further comprise computer program instructions that when executed by one or more computers cause the one or more computers to perform operations comprising applying the changes in response to receiving an authorization.

* * * * *